United States Patent [19]

Brobeck

[11] 4,150,582
[45] Apr. 24, 1979

[54] ROTOR RING FOR INERTIAL ENERGY STORAGE ROTOR

[75] Inventor: William M. Brobeck, Orinda, Calif.

[73] Assignee: Electric Power Research Institute, Inc., Palo Alto, Calif.

[21] Appl. No.: 710,956

[22] Filed: Aug. 2, 1976

[51] Int. Cl.² .................. F16F 15/30; H02K 7/02; H02K 3/48

[52] U.S. Cl. ........................ 74/572; 310/74; 310/271

[58] Field of Search ............. 74/572, 573, 573 F; 310/74, 261, 262, 271, 43

[56] References Cited

U.S. PATENT DOCUMENTS

| 1,351,926 | 9/1920 | Saxon | 310/43 X |
|---|---|---|---|
| 1,438,422 | 12/1922 | Apple | 310/43 X |
| 2,438,206 | 3/1948 | Day | 74/572 |
| 2,711,490 | 6/1955 | Gynt et al. | 310/271 X |
| 2,712,085 | 6/1955 | Willyoung | 310/262 |
| 2,860,267 | 11/1958 | Hayes | 310/43 X |
| 3,151,260 | 9/1964 | McCracken, Jr. et al. | 310/43 |
| 3,244,919 | 4/1966 | Drenth et al. | 310/43 X |
| 3,282,498 | 11/1966 | Smith | 75/572 X |
| 3,305,741 | 2/1967 | Lindner | 310/261 |
| 3,343,013 | 9/1967 | Wightman et al. | 310/43 X |
| 3,486,057 | 12/1969 | Stude et al. | 310/271 X |
| 3,517,238 | 6/1970 | Lake | 310/271 X |
| 3,558,950 | 1/1971 | Raybould | 310/271 X |
| 3,792,299 | 2/1974 | Hallerback | 310/43 X |
| 3,964,341 | 6/1976 | Rabenhorst | 74/572 |

FOREIGN PATENT DOCUMENTS

| 274540 | 11/1965 | Australia | 310/43 |
|---|---|---|---|
| 75786 | 12/1961 | France | 310/43 |

Primary Examiner—Samuel Scott
Assistant Examiner—Don E. Ferrell
Attorney, Agent, or Firm—Townsend and Townsend

[57] ABSTRACT

An improved rotor ring for use in an inertial energy storage rotor, the rotor being defined by a plurality of independent, concentric rotor rings rotatable about a vertical axis. The improved rotor ring includes a cylindrical body portion, fabricated from a fiber composite, and an unreinforced resinous face member attached to one or both of the opposing end faces of the ring. The resinous face member includes a number of radially oriented grooves which are adapted to accept clamps and other elements used to assemble and hold together the rotor rings.

7 Claims, 5 Drawing Figures

U.S. Patent  Apr. 24, 1979  4,150,582
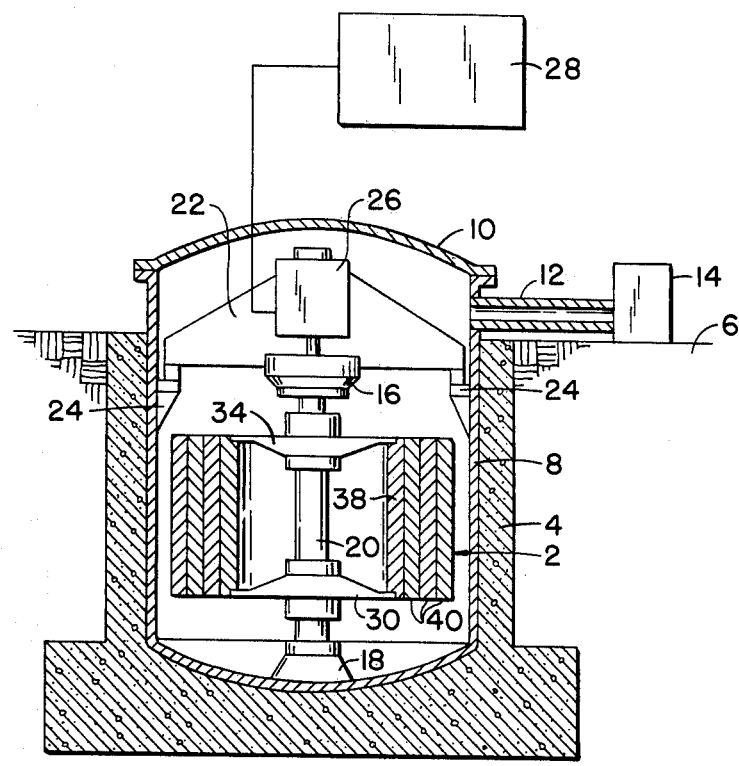
FIG._1.
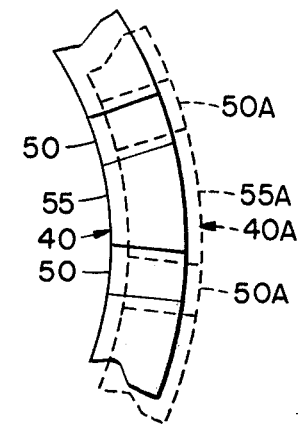
FIG._3.
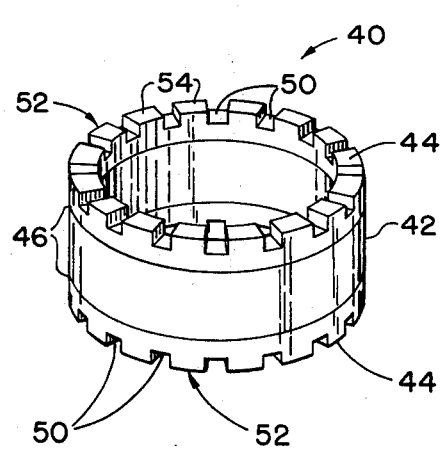
FIG._2.
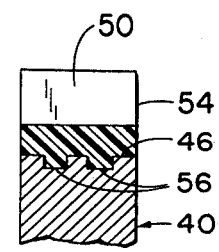
FIG._4A.
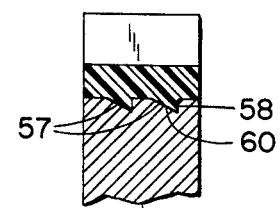
FIG._4B.

ROTOR RING FOR INERTIAL ENERGY STORAGE ROTOR

This invention relates to rotor rings constructed from fiber composite materials and more particularly to fiber composite rotor rings that are provided with unreinforced end faces.

SUMMARY OF THE PRIOR ART

In view of today's increasing demand for more efficient ways to use and store energy, it has become apparent that some method of storing energy available during periods of relatively low energy for later use during peak demand periods is needed. For example, solar energy is readily available during relatively low daytime periods but is frequently unavailable during the peak evening hour demand periods.

Among the several different technologies available to store excess energy are inertial energy storage wheels or rotors. Such energy storage requires that excess energy, normally electrical power, is used to drive an electrical motor-generator to spin the rotor at often very high rates of rotation. To recover the energy, the motor-generator is operated in its generator mode to generate electricity while correspondingly decreasing the rotor's rate of rotation, thereby converting the rotor's initial energy into electrical power.

To store a meaningful amount of energy, the rotors have to be spun at rates as high as 20,000 r.p.m. and more, depending upon the diameter of the rotor. This severely stresses the rotor and requires that it be specially constructed so that it can withstand the centrifugal forces generated by such high rates or rotation.

The stress to which a rotating ring is subjected comprises both hoop or circumferential stresses, which subject the ring material to tension, and radial stresses which subject the material to translaminar tension. The radial stresses are carried by the matrix material only which is relatively weak. Since the radial tensile stress depends upon the ring thickness to radius ratio, the ring must be relatively thin to maintain the stresses within the limits of the matrix material. Thus, to limit the radial stresses in such rings to acceptable values, their radial thickness must be relatively small.

Accordingly, it has been suggested to construct inertial energy storage rotors by combining a number of relatively thin, concentric rings into one rotor. To achieve the necessary high energy storage densities required, the rotor rings are constructed from materials having a high strength-to-weight ratio. The materials with the highest strength-to-weight ratios currently are fiber materials such as those used for reinforcement of plastic composites.

The rings are mounted to a concentric hub, which, in turn, rotates about a vertical axis. Various methods are used to interconnect adjacent inner and outer rings to each other as well as connecting the innermost ring or rings to the hub. Generally, such connections require a plurality of circumferentially spaced-apart and radially aligned grooves to be machined into one or both opposing faces of the individual rotor rings.

Problems exist, however, due to the orthotropic properties of the composites used to construct rotor rings. That is, they possess very high strength in the direction of the fibers (i.e., the circumferential direction) and very little strength in the transverse directions (i.e., the radial direction). Thus, fiber composite materials can withstand only very limited radial forces.

These problems are amplified when radial grooves are cut into the axial end faces of the rotor rings to accommodate connecting apparatus for rotor assembly. During high rates of rotation, the individual rotor rings dilate as a function of the rate of rotation and their mean diameters, resulting from the combined centrifugal forces and offsetting hoop stresses of the circumferentially-oriented fibers to maintain equilibrium. Interruption of the fibers in the axial extremities of the rings by the grooves cancels the restraining hoop stresses of the fibers. The centrifugal forces exerted on the lands (the portions of the axial ends of the rings between the grooves) are restrained, therefore, only by the matrix material that connects the lands to the ring.

Additionally, the interrupted circumferentially-oriented fibers contained in the lands restrain land expansion or dilation during high rates of rotation. The result of the combination of the centrifugal forces exerted on the lands, the dilation of the ring body, and lack of expansion of the lands, was the creation of high shear forces in the vicinity of the juncture between each land and the ring body. These shear forces, in turn, result in cracking of the matrix material at the land-ring juncture and separation of the land from the ring body.

Thus, it is apparent that present rotor rings for use in inertial energy storage rotor wheels have serious drawbacks which limit their potential use and which correspondingly limit the development of otherwise highly desirable inertial energy storage wheels.

SUMMARY OF THE INVENTION

In accordance with the present invention, an improved rotor ring is provided, including a generally cylindrical ring body constructed of a fiber composite material and an unreinforced epoxy resin face member formed on the opposing faces of the ring. The inner and outer diameters of the ring body and face member are substantially the same so that the body and face member are generally concentric. A number of spaced, radially oriented openings or grooves are provided at the axial ends of the rotor ring by cutting or machining the grooves into the resinous face members and thereby defining a number of interstitial areas or lands separating the grooves which are generally axially oriented. The ring body is fabricated from a multiplicity of generally annular reinforcing fibers imbedded in a resinous matrix material. According to one method of constructing the ring of the present invention, one or more circular channels, concentric with the ring, are cut in the axial ends of the ring body before the face member is formed or cast thereon.

The face member is constructed from an unreinforced (fiberless) elastomeric material, similar to the matrix material of the fiber-compounded ring body. The resinous material of the face member, in conjunction with the absence of restraining fibers in the lands, allows the lands to stretch in response to the centrifugal forces exerted thereon as well as the forces created by the dilation of the ring body during high rates of rotation.

It should be apparent, therefore, that the present invention provides an improved rotor ring that may be subjected to higher rotational velocities than those previously encountered. The shearing stresses that may arise at the juncture of the lands and the ring body are absorbed as the deformable resinous material used to fabricate the face member yields to such stresses. In addition, the circular channels provided in the axial ends of the ring body, at the interface between the face member and the ring body, not only improve the bond between the two members, but increases the surface area over which the shear stresses between the body and face member are applied during rotation.

BRIEF DESCRIPTION OF THE DRAWINGS

FIG. 1 is a schematic, elevational view, in section, illustrating an inertial energy storage wheel installation incorporating a multiple ring rotor utilizing rotor rings constructed in accordance with the present invention;

FIG. 2 is a perspective view of a rotor ring, for use in the energy storage installation shown in FIG. 1, constructed in accordance with the present invention;

FIG. 3 is a schematic plan view which, in an exaggerated manner, illustrates the dilation of a rotor ring during high speed operation of the wheel; and FIGS. 4A and 4B are enlarged, fragmentary views of the rotor ring of FIG. 2, taken along lines 4—4 thereof.

DETAILED DESCRIPTION OF THE PREFERRED EMBODIMENT

Turning now to the drawings and particularly to FIG. 1, an installation employing an inertial energy storage wheel or rotor 2 constructed in accordance with the present invention is schematically illustrated. To ensure containment of the rotor 2 in the event of failure, the rotor is housed in a concrete wall 4 lowered into the ground 6 and lined with an impact-resistant material such as steel defining an air-tight, upwardly open tank 8 closed by a cover 10. A fluid conduit 12 connects the interior of the tank with a vacuum pump 14 for evacuating the interior of the tank to as low a pressure as one-tenth millitorr.

Mounted within tank 8 are upper and lower bearings 16 and 18 which journal a rotor shaft 20 for rotation about a radial axis. The upper bearing is supported by a spider 22 carried on pedestals 24 which protrude from the inner wall of the tank 8. The spider also supports a generator-motor 26 which is suitably coupled to rotor shaft 20 and which is controlled by electric controls 28 so that it can alternatively be operated in its generator or its motor mode. Thus, the installation is capable of converting inertial energy of the rotating wheel 2 into electricity or, alternatively, converting electricity into inertial energy by correspondingly increasing the rate of rotation of the wheel (hereinafter sometimes referred to as "rotation"). The detailed construction of the electric controls 28 is well known to those skilled in the art and, therefore, is not further described herein.

The storage wheel or rotor 2 is supported by a single hub depending from a lower end of shaft 20. The rotor illustrated in FIG. 1 is shown to comprise a lower hub 30 as well as an upper hub 34 mounted to shaft 20, which in turn is supported by the earlier-mentioned upper and lower bearings 16 and 18, respectively. Lower hub 30 has an essentially disc-shaped configuration and is conventionally bolted to a flange 36 defining the lower end 32 of shaft 20. The wall thickness tapers outwardly as is conventional for discs which are subjected to high rates of rotation so as to reduce the maximum stress to which the hub is subjected and to further assure a substantially uniform stress in all portions of the hub. Such hubs are conventionally and commonly referred to as Stodola discs.

Various methods are used to attach inner ring 38 to hub 30 and outer rings 40 to inner ring 38, as well as each other, to assemble rotor 2. Most assembly methods require the inner ring 38 to snugly receive, that is, have a close tolerance fit with, evenly-spaced, radially oriented horizontal teeth (not shown) located on the outer periphery of the hub 30. Similarly, outer rings 40 are joined together and to inner ring 38 with clamps (not shown) and the like having radially oriented tabs or teeth.

According to the present invention, an improved rotor ring is shown, and generally designated by the reference numeral 40. The rotor ring 40 is cylindrical in shape and includes a ring body member 42 and end face members 44 coupled to the axial ends 46 of the body member.

A plurality of evenly-spaced, radially oriented openings or grooves 50 are cut or machined into the opposed outer surfaces 52 of the end face members 44. Grooves 50 define, in the interstitial areas between each groove, a number of axially extending lands 54. The grooves 50 are properly dimensioned and oriented to snugly receive and provide a close tolerance fit with the correspondingly dimensioned and oriented tabs or teeth of the clamps (not shown) used to join adjacent rings together and to hub 30 to assemble rotor 2.

Body member 42 of rotor ring 40 may be constructed using the same materials and techniques to construct conventional rotor rings; that is, body member 42 may be a fiber composite constructed by using fiber materials for the reinforcement of a plastic composite. End face members, however, are constructed of an elastomeric material, not containing such fiber materials. The resin used to fabricate end face members 44 presently has the composition of 20% Hycar CTBN (1300×8) in Epon 828 with 1% AMC-3. Hycar CTBN is a reactive liquid nitrile polymer made by B. F. Goodrich Chemical Company. Epon 828 is an epoxy resin made by Shell Chemical Co. AMC-3 is a catalyst used to promote cross linages between the nitrile and epoxy and is manufactured by Cordova Chemical Co. of Sacramento, Calif.

The above-identified compounded resin and Hycar provides an elongation of 3% without failure, which was found to alleviate shear-stress build-up at the juncture of the lands and ring. However, other resinous compositions may also be used.

It should be noted that grooves 50 are shown as extending the entire thickness of the face member. However, it may be that the grooves need only extend over a portion of the thickness of the face member. In any event, the present invention is meant to solve the problems attendant with such grooves, as described herein, whether or not the grooves extend the entire width of the face member or only a portion thereof.

In an alternate embodiment of the present invention, the end face 44 of the ring member 40 is provided a pair of circular, concentric channels 56 of rectangular cross-section (FIG. 4A). Addition of these channels provides a greater surface area, between the ring body 52 and the elastomeric face member 42, over which shear stresses may be relieved. The added surface area also increases bonding.

In addition to the rectangular cross-sectional channel 56 (FIG. 4A), a sawtooth-shaped cross-sectional channel 57 (FIG. 4B) has also been used with good results. The sawtooth cross-section is preferably formed so that the vertical side 58 of each sawtooth cross-section is positioned radially outward of the angular side 60.

Assembly of rotor wheel 2, using rotor rings constructed in accordance with the teachings of the present invention, is conventional. Additionally, the installation of the rotor wheel 2 is also conventional and preferably in such a manner so that the wheel rotates about a vertical axis as illustrated in FIG. 1.

In operation, that is, as the rate of rotation of wheel 2 increases, the individual rings dilate as a function of the rate of rotation and their mean diameters. This dilation, as explained above, is a result of the centrifugal and hoop stresses exerted on the rings. However, as discussed above, the lands 44, situated between any two grooves 50 are subjected only to centrifugal forces. As the ring body beneath the land dilates, extreme sheer stresses are exerted on the juncture between the body of the ring and the land, causing the matrix material of prior art rings to crack, with resultant failure of the entire ring and possible loss of the entire land.

The yieldingly deformable and unreinforced (fiberless) face members 44 of the present invention absorb these shear stresses and avoid such failures during high rotation of the ring 40. Referring specifically to FIG. 3, the absorption of these stresses by the present invention may be more fully described and understood. An undilated portion of ring 40 is shown with the outline of grooves 50 and the land juncture 55 between land 54 and the body of the ring illustrated. Rotation of the ring at a high rate causes ring 40 to dilate to ring 40A. Ideally, the dilation of the ring would be accompanied by corresponding expansions of groove areas 50 to groove areas 50A and land juncture 55 to land juncture 55A.

Unfortunately, such is not the case with prior art rotor rings. Rather, the interrupted fibers contained in the epoxy matrix of land 54 restrained dilation or expansion of the land. Thus, the outline of land 54 remains approximately the same whether ring 40 is in its rest or in its dilated position. Severe shear stresses are thereby created at the juncture 55 of land 54 where the land is connected to the cylindrical portion of the ring. Normally, these shear stresses are released only when the matrix material at the juncture between dilated ring 40A and the land 54 cracks or otherwise separates at the landring body juncture. If, however, the juncture 55 between the land 54 and ring 40, as well as land itself, were allowed to stretch, so to speak, these shear stresses could be absorbed by this stretching and thereby be released.

This, in fact, is the way the present invention remedies the situation described. The end face member 44, of elastomeric construction and without fiber reinforcement, is capable of stretching, as the body of the ring dilates. The shear stresses, that would normally be created in the juncture between the lands of the ring and the ring itself, are thereby absorbed and released by and through this stretching action. Thus, as illustrated in FIG. 3, ring 40 will dilate to ring 40A. The juncture 55 between the land 54 and ring will stretch to juncture 55A.

It will be seen, therefore, that the present invention provides an improved rotor ring capable of attaining higher rotational speeds than previously attempted without fear of losing the lands of the ring as some prior art rings were want to do. For example, a rotor constructed in accordance with the teachings of the present invention attained a rotational rate of 22,000 RPM without failure. Prior art rotors — that is, rotors having ring lands containing interrupted fibers — usually failed, by cracking at the land-ring body junctures and losing the lands entirely, as this rotational rate was approached.

I claim:

1. A rotor ring for use with an inertial energy storage wheel constructed from a plurality of such rotor rings held in relative concentric relation by a connecting means, the rotor ring comprising:
   an annular body member constructed from an elastomeric material reinforced with a multiplicity of generally circumferentially extending fibers, said body member including opposing end faces; and
   an annular face member constructed of a fiberless elastomeric material integrally bonded to at least one end face of said ring body in co-axial alignment therewith, the face member including a plurality of openings that extend over at least a portion of the radial width of the face member and open in a direction parallel to the longitudinal axis of and away from said rotor ring, said openings being adapted to receive said connecting means.

2. The rotor ring of claim 1, including a second annular face member of an unreinforced elastomeric material attached to the opposite face of said body member in co-axial alignment therewith, the second ring member including a plurality of axially aligned grooves adapted to receive the connecting means.

3. The rotor ring of claim 2, wherein each of the end faces of the body member includes a plurality of concentric channels formed in each one of the end faces of the body member.

4. A rotor ring for use in a multiring inertial energy storage wheel, the rotor ring comprising:
   a generally cylindrical body terminating in opposed end faces and constructed of a yieldingly deformable material, the body including a multiplicity of generally annular, circumferentially oriented reinforcing fibers embedded in the material for increasing the circumferential strength of the body; and
   means attached to at least one end face of the body and defining a plurality of openings that extend over at least a portion of the radial width of the body, the openings being disposed on the end face of the body and being formed to open in a direction parallel to a longitudinal axis of and away from the ring, the means being constructed of a fiberless yieldingly deformable material.

5. The rotor ring of claim 4, wherein the means includes an annular member having a plurality of openings extending over at least a portion of the radial width of the annular member.

6. The rotor ring of claim 5, wherein the openings of the annular member open in a direction parallel to the longitudinal axis of and away from the ring to define a plurality of axially extending land members.

7. The rotor ring of claim 4, wherein the means includes a plurality of axially extending lands.

* * * * *